June 18, 1929.    W. E. SYKES    1,717,817
METHOD OF MAKING FLEXIBLE COUPLINGS
Original Filed June 7, 1926    3 Sheets-Sheet 1
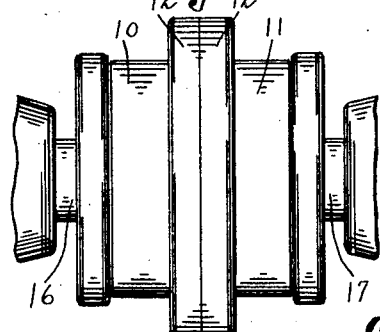
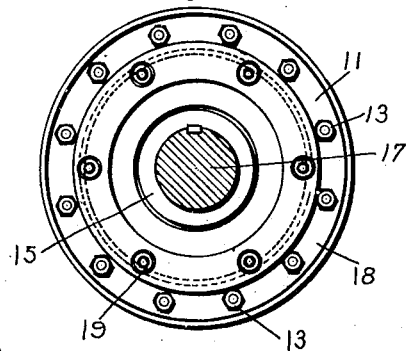
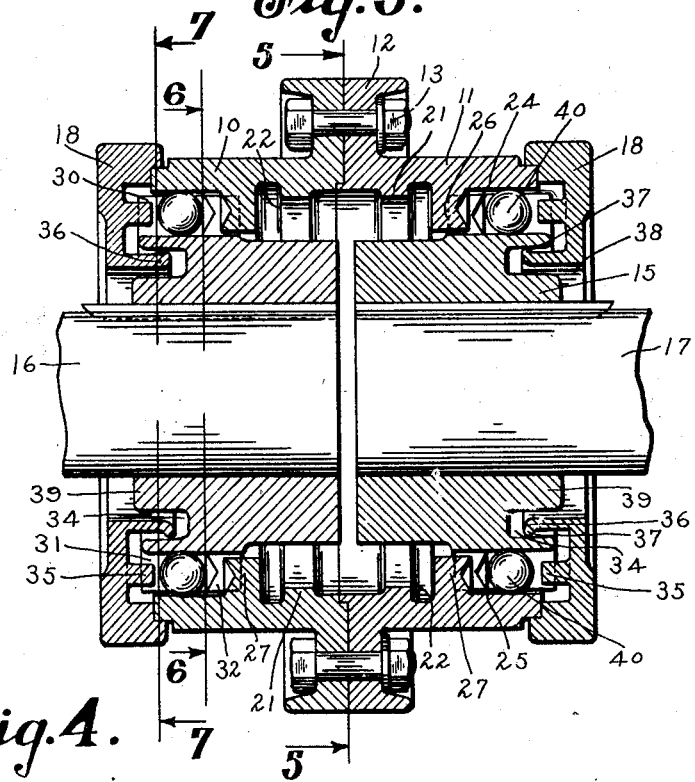
Inventor
William E. Sykes
By Henry E. Rockwell
Attorney June 18, 1929. W. E. SYKES 1,717,817
METHOD OF MAKING FLEXIBLE COUPLINGS
Original Filed June 7, 1926  3 Sheets-Sheet 2

Inventor
William E. Sykes
By Henry E. Rockwell
Attorney

June 18, 1929.  W. E. SYKES  1,717,817
METHOD OF MAKING FLEXIBLE COUPLINGS
Original Filed June 7, 1926  3 Sheets-Sheet 3
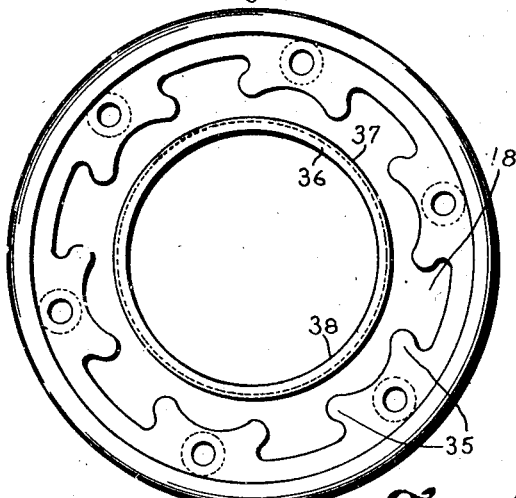
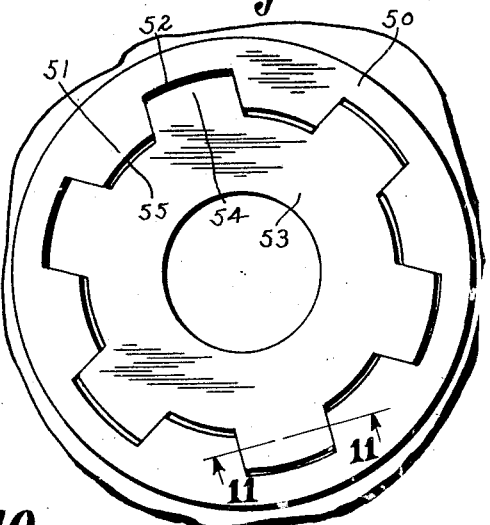
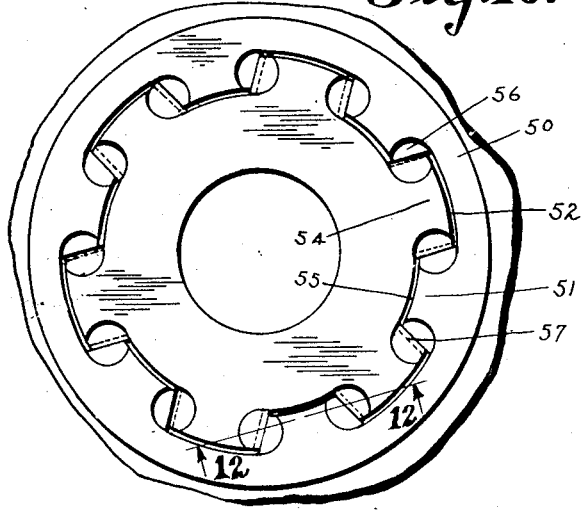
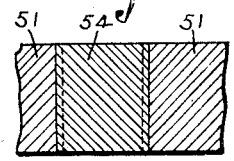
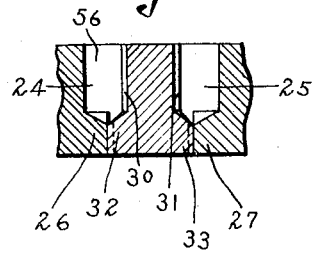
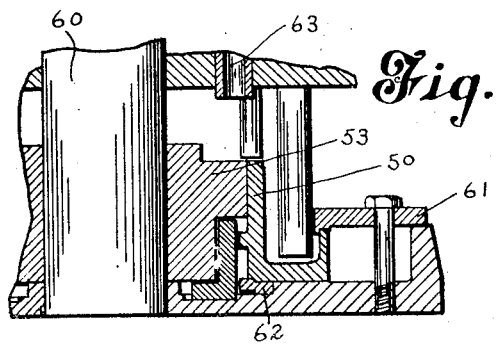
Inventor
William E. Sykes
By Henry E. Rockwell.
Attorney Patented June 18, 1929.

1,717,817

UNITED STATES PATENT OFFICE.

WILLIAM E. SYKES, OF BUFFALO, NEW YORK.

METHOD OF MAKING FLEXIBLE COUPLINGS.

Original application filed June 7, 1926, Serial No. 114,174. Divided and this application filed August 16, 1927. Serial No. 213,364.

This invention relates to flexible or universal couplings for connecting the ends of abutting shafts or the like together. More especially this invention contemplates improvements in couplings designed for such use wherein rotatable members are interposed between the operating parts thereof to allow freedom of movement between the connected shafts, during the rotation thereof, in angular, axial and lateral directions, so as to prevent vibration and undue friction at the shaft bearings due to possible misalignment of the connected shafts. The coupling to be hereinafter described is somewhat similar to the coupling described and claimed in an application of William E. Sykes, Serial No. 753,458 filed December 2, 1924, and may in certain aspects be considered an improvement thereover or a modification thereof. This application is a divison of Serial No. 114,174 filed June 7, 1926, by William E. Sykes.

This invention relates specifically to the method of making a flexible shaft coupling, as disclosed in the co-pending application No. 114,174.

The object of this invention is to develop and provide a method of manfacture for couplings of this type, so as to produce the same economically and in quantity, while at the same time retaining the required degree of accuracy.

To these and other ends the invention consists in the method of making a flexible coupling, as will be hereinafter described and claimed.

In the accompanying drawings:

Fig. 1 is an elevation of a coupling embodying the features of this invention;

Fig. 2 is an end view of the same;

Fig. 3 is a section on line 3—3 of Fig. 5;

Fig. 4 is a partial section on line 4—4 of Fig. 5;

Fig. 8 is an inner face view of the end plate of the coupling;

Fig. 9 is an end view of certain parts of the coupling partially formed and assembled together for the purpose of having further operations, in the course of the manufacture thereof, performed;

Fig. 10 is a view of the parts shown in Fig. 8, after certain manufacturing operations have been performed, and indicating in dotted lines still further operations;

Fig. 11 is a section on line 11—11 of Fig. 9;

Fig. 12 is a section on line 12—12 of Fig. 10, and

Fig. 13 is a sectional view through one of the tools used during one of the manufacturing operations.

Figure 5:
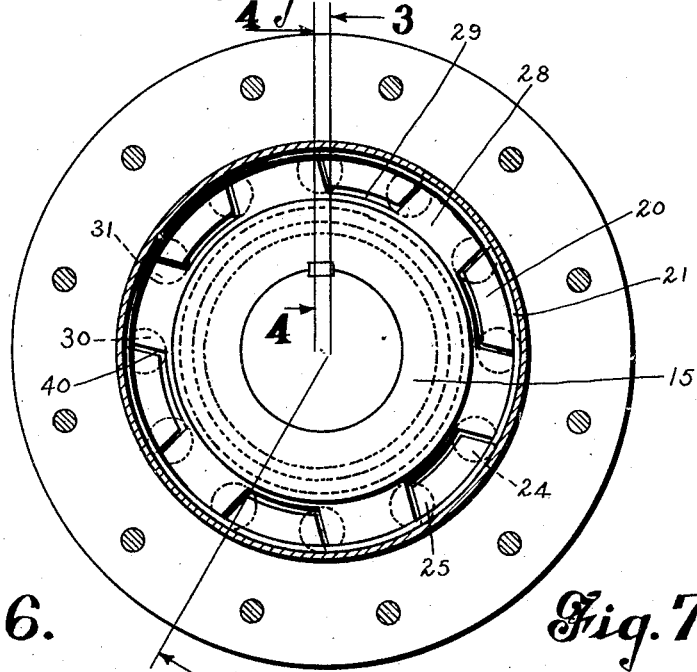
Fig. 5 is a section on line 5—5 of Fig. 3.
Figure 6:
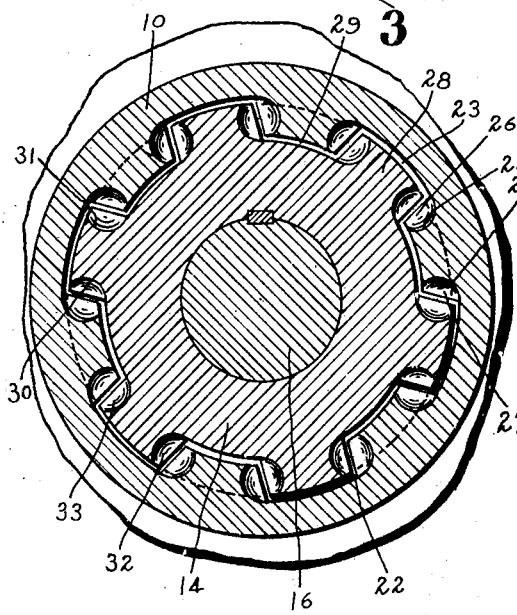
Fig. 6 is a section on line 6—6 of Fig. 3.
Figure 7:
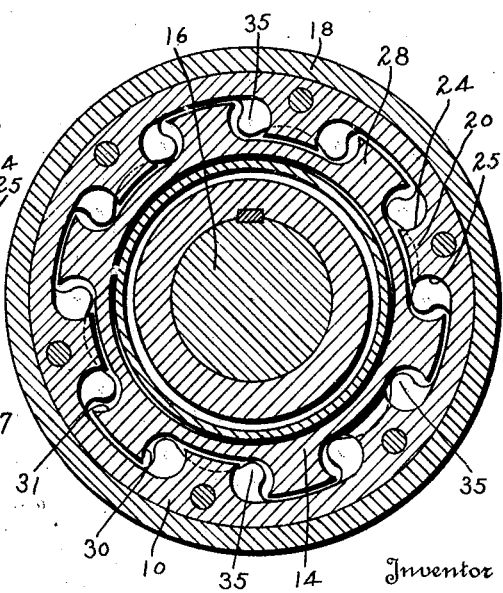
Fig. 7 is a section on line 7—7 of Fig 3.

The coupling shown in the drawings comprises an outer casing composed of two flanged sections 10 and 11, bolted together above the abutting flanges 12 by the bolts 13, the inner members or shaft hubs 14 and 15 which are keyed or otherwise secured to shaft ends 16 and 17 respectively, and end caps or cover plates 18 which are secured to the outer casing by means of the screws 19.

The outer casing is, in this instance, in the form of a hollow cylinder having upon its inner wall a series of radially and inwardly projecting lugs 20 which are equally spaced about the periphery thereof. The lugs 20 extend axially of the casing from each end of the casing toward each other. Axially spaced from the inner end of each series of lugs is a radially and inwardly projecting ring 21 for a purpose to be hereinafter described. The ring 21, in this instance, is illustrated as being in two portions but obviously the same could be formed integral as one piece in order to provide an axially and outwardly facing shoulder 22 of a lesser diameter than the inner diameter of the casing at the spaces 23 between the lugs 20.

The lugs 20 are each provided with axially directed grooves 24 and 25, one groove being in each of the side faces thereof. Preferably the grooves 24 and 25 are substantially semicircular in cross-section and extend axially inwardly from the outer ends of the lugs a greater part of the length thereof. The remainder of the material in alignment with the grooves 24 and 25 is retained integral with the lugs to form stops or abutments 26 and 27 closing the inner ends of the grooves.

The inner members or shaft hubs 14 and 15 are provided with outwardly extending lugs 28 equally spaced about the periphery thereof, forming spaces 29 therebetween, the lugs 28 extending axially of each member from the outer end thereof. The hub member axially and inwardly beyond the lugs 28 is reduced in diameter sufficiently to avoid possible interference with other parts of the coupling. Each of the lugs 28 is provided with axially directed grooves 30 and 31, one groove being in each of the side faces thereof. Preferably these grooves are semi-circular in cross-section and extend axially inwardly from the outer ends of the lugs the greater part of the length thereof. The remainder of the material of the lugs 28 in alignment with the grooves 30 and 31 is retained integral with the lugs to form stops or abutments 32 and 33 closing the inner ends of the grooves. The outer face of each inner member is provided with the annular groove 34 forming part of an oil trap.

The end caps or cover plates 18 are provided with a series of lugs 35 integrally formed upon the inner face thereof and extending axially inwardly with respect to said coupling. The lugs 35 are disposed about the inner face of each plate 18 so as to be in alignment with the grooves in the lugs of both the outer casing and the inner member adjacent thereto. The lugs 35, therefore, will act as stops or abutments to close the outer ends of the respective grooves 24 and 25 and 30 and 31. The plates 18 may also be provided with an annular ring 36 which extends axially and inwardly into the annular groove 34 of the adjacent inner member and has an annular rib 37 extending peripherally about its inner end of increased diameter. An opening 38 is provided on each end plate 18, which surrounds the outer end portion 39 of the inner members but is not in contact therewith thereby allowing a certain amount of play therebetween.

The above described parts are assembled together in such a manner that the lugs 20 of the outer casing are interlocked between the lugs 28 of the inner member in the spaces 29 therebetween, while the lugs 28 of the inner member are disposed in the spaces 23 formed between the lugs 20 of the outer casing. This arrangement causes the respective grooves in the side faces of the lugs of each member to coincide to form a substantially circular opening therebetween, and also causes the respective abutments 32 and 33 of the inner member and 26 and 27 of the outer casing to coincide. Into each of the circular openings so formed, a rotatable member 40 is placed which, in this instance, is spherical in form. The rotatable members 40, while being free to rotate in any direction, are confined within the circular openings between the respective lugs at one end thereof by means of the abutments or stops 26 and 27 and 32 and 33. The rotatable members 40 by substantially filling up each of the openings peripherally with respect to the casing, complete the interlocking of the casing with the inner members and provide the means for driving one from the other without allowance of play therebetween, it being understood that the lugs 28 of the inner member are smaller in width peripherally than the width of the spaces between the lugs 20 of the outer casing.

The outer cap 18 is secured to the outer casing by the screws 19 in such a manner that the lugs 35 are disposed in alignment with the opening formed by the coinciding grooves in the lugs of the inner member and outer casing, and therefore act as outer stops or abutments to retain the rotatable members 40 within these openings.

The annular ring 21 of the outer casing being smaller in diameter than the internal diameter of the spaces between the lugs 20 is also smaller in diameter than the external diameter of the lugs 28 upon the inner member so that each inner member is prevented from sliding through the casing sufficiently to allow the rotatable members 40 to become disengaged from the openings and to drop in between the outer cap 18 and the inner member.

In case one or more of the rotatable members 40 should break while the coupling is under driving load, no serious damage would result due to the fact that the coinciding stops or abutments 26 and 27 and 32 and 33, respectively, would become engaged and continue the connection between the rotating shafts. This advantageous feature prevents a possible shut-down of an entire manufacturing plant or portion thereof, especially where the coupling is used in connection with a main drive, thereby preventing considerable loss in production and possible damage to machinery and equipment.

In operation, assuming that the shaft end 16 is the driver, the connected hub or inner member 14, through the lugs 28, the rotatable members 40 and the lugs 20 of the outer casing, drives the outer casing which in turn through lugs 20, rotatable members 40, lugs 28 and the inner member 15 connected to the shaft end 17 drives the shaft 17. As described in the copending application above identified, the shafts 16 and 17 may be offset from each other either laterally, vertically or angularly, with no disadvantage being present due to binding of the coupling parts, undue friction upon the shaft bearings nor vibration because of the misalignment therebetween. The coupling illustrated will take care of every kind of misalignment whether it be angular, offset, or combined angular and offset, it being understood that the misalignment is, of course, within limits which are approximately five degrees for angularity, and 4% of the maximum shaft diameter for the offset. That is to say, the offset limit for a coupling used with a 4″ diameter shaft will allow an offset between the coupled shafts of .16 inches.

When a lubricant is used within the coupling casing, the same is retained therein by the coperative action of the interlocked parts 36 and 37 of the outer plate, and the annular groove 34 of the inner members, although in some instances these parts may be omitted. The above described coupling, however, may work satisfactorily without internal lubrication due to the perfect co-ordination of its parts.

In order to obtain the efficient co-ordination of the parts of the above described coupling, a novel method of manufacturing has been developed, the operations of which will now be described with reference to Figs. 9 to 13, inclusive.

An outer casing blank 50 is provided by casting or forging the same from a suitable metal with the lugs 51 spaced apart by spaces 52 about the interior thereof. A blank 53 of an inner member is also provided with the lugs 54 thereof spaced apart by the spaces 55 about the outer periphery thereof.

The lugs 54 of the inner member blank 53 are arranged to fit tightly in the spaces 52 of the casing blank, as shown in Figs. 9 and 11. The members are then placed in a jig similar to that partially shown in Fig. 13, wherein the inner member blank 53 is properly located by means of the centering post 60 and the outer casing securely clamped and located by the clamp 61 and the locating ring 62. By means of a properly located drill bushing 63 a hole 56 is drilled and accurately reamed between and partially in each of the lugs 51 and 54 of the casing blank 50 and the inner member blank 53, respectively, as shown in Figs. 10 and 12. The diameter of the opening after reaming is substantially equal to the diameter of the rotatable members to be used. The parts are then removed from the jig and a portion of the material is, in this instance, removed from each of the sides of the lugs 54 of the inner member blank 53, as indicated at 57 by dotted lines in Fig. 10, so that sufficient clearance will be provided between these lugs and the lugs 51 of the outer casing blank 50. Being drilled and reamed together, the two blanks when completed will of necessity cooperate with each other to operate efficiently.

It has been found advantageous to harden the metal surrounding the grooves 24, 25, 30 and 31, in order to obviate wear upon the surfaces thereof. The hardening operation generally consists of heating the surfaces of the grooves by means of an oxy-acetylene torch, after which the surface is covered with cyanide of potassium and quenched in water. This operation is performed before the assembly of the parts, as above described, preferably after the blanks are drilled, reamed and have had the metal removed from the sides of the lugs for clearance.

While I have shown and described the preferred methods and steps of making the flexible coupling, it will be understood that it is not to be limited to the order of operations thereof, as these are capable of modifications and variations which will lie within the spirit of the invention and the scope of the appended claims.

What I claim is:

1. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening between said lugs, and removing material from the sides of the remaining portions of the lugs of one of said members and disposing a curved member between the opposing sides of said lugs.

2. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening part way through and between said abutting lugs, removing material from the sides of the remaining portions of the lugs of said members and disposing a member in each of the openings to drivingly engage the opposing sides of said lugs.

3. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening between each of said abutting lugs of equal depth in each, removing material from the sides of the remaining portions of the lugs of one of said members and inserting rotatable members between the sides of said lugs within said openings, said rotatable members being of a width substantially equal to the diameter of said openings.

4. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening part way through and between said abutting lugs, part of each of said openings being in the casing lug and part in the hub member lug, removing material from the sides of the remaining portions of the lugs of one of said members and disposing in each opening to drivingly connect said members.

5. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening between each of said abutting lugs of equal depth in each, removing said hub member from said casing member, removing material from the sides of the remaining portions of the lugs of one of said members, assembling the two parts together, and inserting rotatable members between the sides of the lugs thereof within said openings.

6. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening part way through and between said abutting lugs, part of each of said openings being in the casing lug and part in the hub member lug, and removing material from the sides of the remaining portions of the lugs of one of said members, and then hardening the metal surrounding the openings formed in said casing and said hub member lugs and disposing a member in each opening to drivingly connect said members.

7. The method of making shaft couplings or the like, which comprises providing a hollow casing member with depending lugs upon its interior periphery, and a hub member with upstanding lugs upon its exterior periphery, assembling both members together with the hub member lugs tightly fitted in the spaces between the casing lugs, forming an axially extending opening part way through and between said abutting lugs, part of each of said opening being in the casing lug and part in the hub member lug, and removing material from the sides of the remaining portions of the lugs on one of said members, and then hardening the metal surrounding the openings formed in said casing and said hub member lugs, assembling the two parts together, and inserting rotatable members between the sides of the lugs thereof within said openings.

8. The method of making shaft couplings or the like, which comprises providing a hollow casing member with depending lugs upon its interior periphery, and a hub member with upstanding lugs upon its exterior periphery, assembling both members together with the hub member lugs in the spaces between the casing lugs, forming an axially extending opening part way through and between said abutting lugs, part of each of said openings being in the casing lug and part in the hub member lug and inserting a member in each of said openings to drivingly connect said members.

9. The method of making shaft couplings or the like, which comprises providing a hollow casing member with depending lugs upon its interior periphery, and a hub member with upstanding lugs upon its exterior periphery, assembling both members together with the hub member lugs in the spaces between the casing lugs, forming an axially extending opening part way through and between said abutting lugs, part of each of said openings being in the casing lug and part in the hub member lug, and inserting rotatable members between the sides of the lugs thereof within said openings.

10. The method of making a coupling, which comprises providing a ring member with depending lugs upon its interior periphery, and a cylindrical member with upstanding lugs upon its exterior periphery, the lugs of one being adapted to enter the spaces between the lugs of the other, forming grooves in the sides of each of the lugs of each member to form an opening therebetween, and inserting a member in each of the openings so formed to drivingly connect said members.

11. The method of making a coupling, which comprises providing a ring member with depending lugs upon its interior periphery, and a cylindrical member with upstanding lugs upon its exterior periphery, disposing the lugs of one of said members between the lugs of the other, providing an axially directed opening between the opposing faces of the lugs and inserting a member in each of the openings to drivingly connect said members.

12. The method of making a coupling, which comprises providing a ring member with depending lugs upon its interior periphery, and a cylindrical member with upstanding lugs upon its exterior periphery, the lugs of each member being spaced apart to form spaces therebetween, said spaces being of greater width in one member than the width of the lugs in the other member, disposing the lugs of one member in the spaces between the lugs of the other member, providing an axially directed opening between the opposing faces of said lugs and inserting a member in each opening to space apart the opposing faces of said lugs.

In witness whereof, I have hereunto set my hand this 15th day of August, 1927.

WILLIAM E. SYKES.

CERTIFICATE OF CORRECTION.

Patent No. 1,717,817. Granted June 18, 1929, to

WILLIAM E. SYKES.

It is hereby certified that error appears in the printed specification of the above numbered patent requiring correction as follows: Page 4, line 1, claim 4, after the word "disposing" insert the words "a member"; and that the said Letters Patent should be read with this correction therein that the same may conform to the record of the case in the Patent Office.

Signed and sealed this 30th day of July, A. D. 1929.

(Seal)

M. J. Moore,
Acting Commissioner of Patents.